April 7, 1964 J. J. LANE ETAL 3,128,261
PROTECTIVE COATING
Filed Dec. 16, 1960

INVENTORS.
JOHN J. LANE,
LAWRENCE F. FLAHERTY.
BY Oscar B. Brumback
their
ATTORNEY.

United States Patent Office 3,128,261
Patented Apr. 7, 1964

3,128,261
PROTECTIVE COATING
John J. Lane, Murrysville, Pa., and Lawrence F. Flaherty, Augusta, Ga., assignors to Koppers Company, Inc., a corporation of Delaware
Filed Dec. 16, 1960, Ser. No. 76,185
5 Claims. (Cl. 260—28.5)

This invention relates generally to bituminous compositions, and more particularly, to improved protective coal tar compositions having a high degree of elasticity and flexibility, low-temperature susceptibility, excellent adhesion, ease of application, and good corrosion resistance.

Conventional coal tar coating compositions are of two groups, namely, hot-applied and cold-applied. Hot-applied coating compositions give excellent electrical resistance in underground service. However, hot-applied coal tar compositions will not adhere to a substrate without the use of a primer because the hot material chills upon application to the substrate end, therefore, does not wet the substrate surface enough to secure a proper binding. The heretofore known cold-applied coal tar coating compositions are more flexible but cannot be applied as heavily to a surface as the hot compositions because such cold-applied compositions depend upon evaporation from the compositions of a solvent after the coating composition has been set in place. Further, such solvent loss tends to leave a more porous coating surface. The conventional heretofore known cold-applied coal tar compositions, therefore, do not develop the water resistance and electrical resistivity of the hot-applied material.

A novel, modified coal-tar pitch coating composition has now been discovered, which may be applied to any surface as a cold-applied coating or as a hot melt composition, or as a composition which includes solvents that evaporate from the composition. In each case, the composition, when applied to the substrate, has outstanding protective qualities, a high degree of flexibility, the ability to be applied in any thickness without the use of a primer and the ability to form a perfect bond instantly on application to the vapor. Additionally, this coating composition possesses a high degree of water-resistance and electrical resistivity over an extended period of time. The composition of this invention may, because of the aforementioned properties, be used as hot-applied crack and joint fillers, caulking compounds, roof coatings or protective coatings for use in corrosive environments.

To produce the novel compositions of this invention, coal and a synthetic elastomer are dissolved in a mixture of coal-tar pitch and a high-boiling aromatic oil to yield an elastic, instantly adherent waterproof compound exhibiting all the desirable properties of an ideal coating composition. This compound is capable of wide utility, for example, it may be used as a protective coating for metal, wood, tile, and fabric of all kinds, as a caulking compound for windows and buildings, and as a crack and joint sealer for swimming pools. The adhesive nature of this composition is such that almost all known materials will adhere to it, including the fluorocarbon polymers which are noted for their complete refusal to be bonded by any previously known adhesive.

The above objects and further novel features of the invention will appear more fully from the following detailed description, when the same is read with the accompanying drawing. It is to be expressly understood, however, that the drawing is not intended as a definition of the invention, but is for the purpose of illustration only:

Coal-tar pitch is the residue resulting from the distillation of coal tar. The pitch is usually a resinous material having no well-defined melting point. For use in this invention, the coal-tar pitch may have a ring and ball softening point, as determined by the procedure ASTM D–36, of between 80° F. and 200° F. Below 80° F., the coal-tar pitch renders the resulting composition too fluid for most applications. A ring and ball softening point about 200° F. gives a pitch which is too hard, making it difficult to dissolve the elastomer. It is preferred that the coal-tar pitch have a ring and ball softening point within the range of 120° F. to 130° F. Within the preferred range, the coal-tar pitch contributes greater adhesion and heat-resistance to the final composition.

A suitable high-boiling aromatic oil is heavy creosote oil, a distillate aromatic oil which initially boils within the range of 290° C.–350° C. and is usually the distillation product that remains above the temperature which naphthalene distills off, but below the point at which pitch is formed. The preferred material for use in our compositions has a distillation range lying between 230° C. and 530° C.

The coal used is advantageously a good grade of soft or bituminous coal. The bituminous coal should have volatile matter in excess of 10%, as determined by ASTM Test Procedure D–27. If the volatile matter be less than 10%, then the coal will contain an excess of contaminating material, making difficult the dissolving of the coal. The coal advantageously provides the final composition with excellent temperature resistance.

The synthetic elastomer for use in this invention is advantageously a copolymer of acrylonitrile and butadiene, and is comprised of a major portion of butadiene and a minor portion of acrylonitrile. Such synthetic elastomers are commercially available and carry a United States Government sign "GR–A." The higher the acrylonitrile content, the harder it is to dissolve the copolymer in the tar and the lower the acrylonitrile content, the easier it is to dissolve the copolymer in the tar, however, the more susceptible the formulation becomes to solvents. Butadiene acrylonitrile copolymers comprised of from 51 to 81 parts by weight of butadiene and from 49 to 20 parts by weight of acrylonitrile are advantageous for use with this invention.

Figure 1:
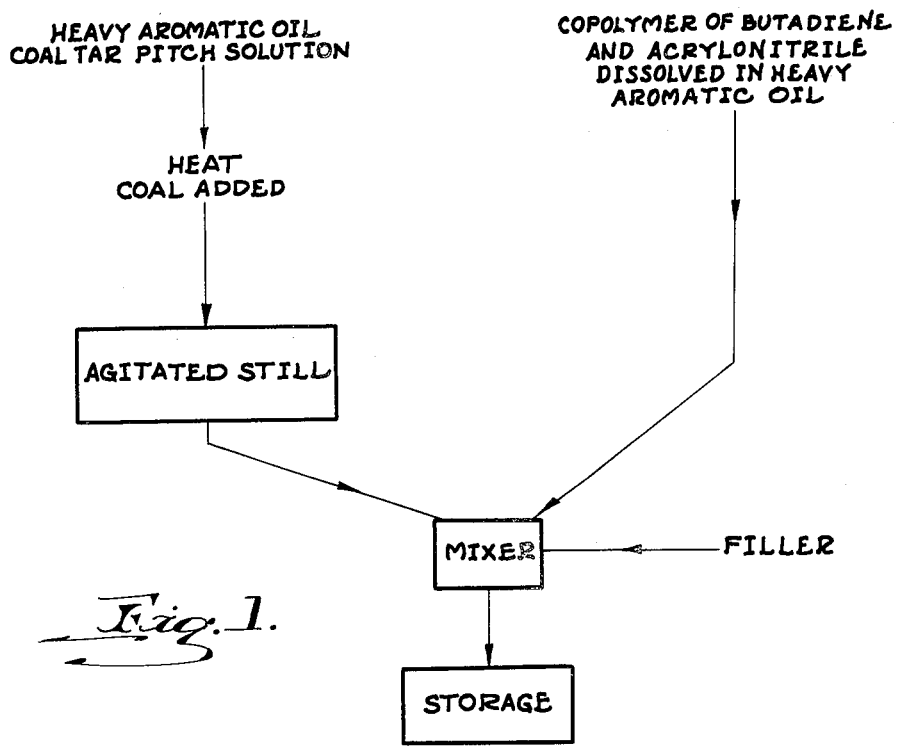
FIGURE 1 illustrates, schematically, a process for preparing the novel composition in accordance with the invention.
Figure 3:
FIGURE 3 illustrates a simple caulking cartridge containing the composition of this invention.
Figure 2:
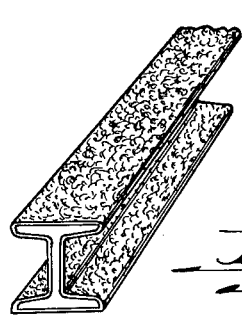
FIGURE 2 illustrates, in an exaggerated manner, a steel I-beam encapsulated with the novel composition of this invention.

The manner in which the components are mixed is not critical; an advantageous procedure, however, referring to FIGURE 1, is to add the heavy creosote oil to the coal-tar pitch, heat to 149° C. and then add the coal. Advantageously, the coal is pulverized so that 90% passes through a 40 mesh screen. This pulverization is desirable because the larger the size of coal particle, the longer the time required for the coal to dissolve, and the smaller the particle, of course, the less time is required for dissolving the coal. This mixture of coal and oil is then agitated and the temperature raised to 600° F. to dissolve the coal in the oil. Maintain this material at 316° C. until the coal dissolves and until the resulting pitch, when sampled, has a penetration at 77° F. of 10–15 mm. (100 grams 5 seconds ASTM D–5). In general, if the penetration be greater than 35, the material is too ductile for most applications, and if less than 2, the material tends to be brittle and hard. The softening point of the resulting material, in accordance with ASTM Procedure D–36, is advantageously within the range of from 200° F. to 300° F.

The pitch, resulting from the solution of coal in the coal-tar pitch and heavy creosote oil, is cooled to about 300° F. and maintained at this temperature as the synthetic elastomer is added with agitation. To facilitate the solution of the elastomer in the coal tar, the copolymer may be broken down in a rubber mill. Convenient products for use in this invention are butadiene acrylonitrile synthetic rubbers, sold under the name "Hycar" by the B. F. Goodrich Company. The temperature is maintained until the rubber has completely dissolved in the solution. The temperature at this time may be higher or lower. At the lower temperature, however, the synthetic elastomer dissolves at a slower rate. At a temperature above 330° F., the elastomer tends to decompose. The amount of synthetic elastomer in the resulting mixture is advantageously not below 3% for coating applications because below this value, the outstanding adhesive characteristics are not as predominant, although the good temperature susceptibility remains. The elastomer content may be as high as the solubility content of the rubber solution. This limit varies but is usually around 15%. Advantageously, the elastomer content is maintained at between 1% to 10%.

Compositions which have been found suitable include:

| | Percent |
|---|---|
| (1) Coal-tar pitch | 10–44 |
| (2) High-boiling aromatic oil | 25–65 |
| (3) Coal | 10–40 |
| (4) Synthetic rubber | 1–20 |

The amount of pitch and of other components depends upon the temperature of application and the degree of adhesion required.

Fillers may be added to produce a coating composition of any consistency. Such fillers include ball clay, china clay, zinc oxide, lead chromate, barium sulphates, asbestos, iron oxide, and talc and the like.

The following examples of modified coal-tar coating compositions are given by way of illustration, and not by limitation:

*Example I*

40 parts of heavy creosote oil are added to 30 parts of coal-tar pitch. The temperature of this mixture is raised to 350° F. (1 hr.) and 30 parts of pulverized coal added. The mixture is then placed in an agitated still and heated to a temperature of 600° F. and held at this temperature for 1 hour or until the coal dissolves. The mixture is then cooled for 2 to 3 hours to 300° F. and 5 parts of a medium molecular weight copolymer of butadiene and acrylonitrile (75:25 ratio), and 30 parts of heavy creosote oil are added. The mixture is then maintained at 300° F. for four hours. Thereafter, 35 parts of ball clay are added and mixed for three hours.

The resulting composition is a black, thick, creamy material having a viscosity at 250° F., using a Brookfield viscometer, Model LVF Spindle Number 4, 12 r.p.m., of between 20,000 and 40,000 centipoises, and a penetration of 100–140 mm. at 77° F. (50 gms.; 5 seconds) ASTM D–5 and a ring and ball softening point of 45° C. to 55° C.

The composition, as prepared in this example, was applied to a steel I-beam of the type used in construction. Subsequently, the thus-coated I-beam was further encapsulated in concrete. The composition adhered completely to both the metal beam and to the concrete cover, preventing any deterioration or corrosion of the metal beam by the action of the corrosive agents present in concrete. The composition of this example can be similarly applied to other metal construction materials which are to be coated with concrete, such as aluminum.

*Example II*

5 parts of a medium molecular weight copolymer of butadiene and acrylonitrile in a 51 to 49 ratio are added to 30 parts of an aromatic distillate boiling in the range 230° C.–315° C. The temperature of this mixture is raised to 300° F. and agitated for two hours (blend A). Coincidentally, 30 parts of heavy, creosote oil are added to 30 parts of coal-tar pitch, the temperature raised to 350° F., and 40 parts of pulverized coal added. The mixture is agitated and the temperature raised to 600° F. and held at this temperature for one hour or until the coal dissolves (blend B). Blends "A" and "B" are then combined in an agitated vessel at a temperature between 200° F.–300° F. for one hour.

The resulting composition is a material having a viscosity at 250° F., using a Brookfield viscometer, Model LVF Spindle Number 4, 12 r.p.m., of between 8,000–16,000 centipoises and a penetration of 140–240 mm. at 77° F. (50 gms.; 5 seconds) ASTM D–5, and a ring and ball softening point of 40° C.–50° C.

*Example III*

40 parts of heavy creosote oil are added to 30 parts of coal-tar pitch. The temperature of this mixture is raised to 350° F. and 30 parts of pulverized coal added. The mixture is then placed in an agitated still and heated to a temperature of 600° F. and held at this temperature for one hour or until the coal dissolves. The mixture is then cooled for 2 to 3 hours to 300° F. and 20 parts of a high molecular weight copolymer of butadiene and acrylonitrile in a 75:25 ratio and 30 parts of aromatic distillate, are added. The mixture is then maintained at 300° F. for four hours when 50 parts of ball clay are added and mixed for three hours.

The resulting composition is a material having a minimum viscosity at 250° F., using a Brookfield viscometer, Model LVF Spindle Number 4, 12 r.p.m., of 40,000 centipoises and a penetration of 80–160 mm. at 77° F. (50 gms.; 5 seconds) ASTM D–5 and a ring and ball softening point of 35°C.–50° C.

*Example IV*

40 parts of heavy creosote oil are added to 30 parts of coal-tar pitch. The temperature of this mixture is raised to 350° F. and 40 parts of pulverized coal added. The mixture is then placed in an agitated still and heated to a temperature of 600° F., and held at this temperature for one hour or until the coal dissolves. The mixture is then cooled to 300° F. and 15 parts of a low molecular weight copolymer of butadiene and acylonitrile in a 75:25 ratio and 30 parts of an aromatic distillate oil boiling in the range of 230° C.–315° C., are added. The mixture is then maintained at 300° F. for four hours, when 50 parts of ball clay are added and mixed for three hours.

The resulting composition is a material having a viscosity, while hot, at 250° F., using a Brookfield viscometer, Model LVF Spindle Number 4, 12 r.p.m., of between 20,000–35,000 centipoises and a penetration of 100–160 mm. at 77° F. (50 gms.; 5 seconds) ASTM D–5, and a ring and ball softening point of 40° C.–55° C.

*Example V*

5 parts of medium molecular weight copolymer of butadiene and acrylonitrile are added to 30 parts of heavy creosote oil. The temperature of this mixture is raised to 300° F. and agitated for three hours (blend "A"). Coincidentally, 30 parts of heavy creosote oil are added to 30 parts of coal-tar pitch, the temperature raised to 350° F. in one hour and 40 parts of pulverized coal added. The mixture is agitated and the temperature raised to 600° F. and held at this temperature for one hour until the coal dissolves (blend "B"). Blend "A" and "B" are then combined in an agitated vessel at a temperature between 200° F.–330° F. for one hour. To 60 parts of this blend, 20 parts of a filler, ball clay, are added with agitation and 20 parts of solvent, such as xylene, are added. The mixture is cooled to room temperature and is ready for use.

The product, as prepared in Example V, was applied to a 10 x 10 sheet of galvanized sheet metal in one-half inch thickness. Similarly, another galvanized sheet was coated with a non-commercially available coal-tar composition containing a solvent. The two coated sheets were then immersed in a trough of continuously flowing sea water and inspected periodically. After three months, the conventional material was losing its bond to the metal and becoming hard, as some of the oils were being extracted. The material, as prepared in Example V of this invention, still exhibited perfect adhesion to the metal while maintaining its original flexibility. After six months, the conventional material had very poor bond to the metal and was hard and brittle. The product of this invention was still in excellent condition and retained its flexibility.

*Example VI*

6 parts of medium molecular weight copolymer of butadiene and acrylonitrile are added to 25 parts of heavy creosote oil. The temperature of this mixture is raised to 300° F. and agitated for three hours (blend "A"). Coincidentally, 25 parts of heavy creosote oil are added to 30 parts of coal-tar pitch, the temperature raised to 350° F. and 30 parts of pulverized coal added. The mixture is agitated and the temperature raised to 600° F. and held at this temperature for one hour until the coal dissolves (blend "B"). Blends "A" and "B" are then combined in an agitated vessel at a temperature between 200° F.–330° F. To 50 parts of this blend, 27 parts of a filler, talc, are added with agitation. The mixture is cooled to room temperature and is ready for use.

The resulting composition is a material having a viscosity, while hot, at 250° F., using a Brookfield viscometer, Model LVF Spindle Number 4, 12 r.p.m., of between 15,000–23,000 centipoises and a penetration of 120–200 mm. at 77° F. (50 gms.; 5 seconds) ASTM D–5, and a ring and ball softening point of 30° C.–60° C.

*Example VII*

10 parts of medium molecular weight copolymer of butadiene and acrylonitrile are added to 27 parts of heavy creosote oil. The temperature of this mixture is raised to 300° F. and agitated for three hours (blend "A"). Coincidentally, 27 parts of heavy creosote oil are added to 55 parts of coal-tar pitch, the temperature raised to 350° F. (two to three hours) and 14 parts of pulverized coal added. The mixture is agitated and the temperature raised to 600° F. and held at this temperature until the coal dissolves (blend "B"). Blends "A" and "B" are then combined in an agitated vessel at a temperature between 200° F.–330° F. To 50 parts of this blend, 40 parts of a filler, barium sulphate, are added with agitation for three hours. The mixture is cooled to room temperature and is ready for use.

The resulting composition is a material having a viscosity, while hot, at 250° F., using a Brookfield viscometer, Model LVF Spindle Number 4, 12 r.p.m., of between 20,000–30,000 centipoises and a penetration of 120–220 mm. at 77° F. (50 gms.; 5 seconds) ASTM D–5, and a ring and ball softening point of 40° C.–60° C.

*Example VIII*

5 parts of medium molecular weight copolymer of butadiene and acrylonitrile are added to 37 parts of heavy creosote oil. The temperature of this mixture is raised to 300° F. and agitated for three hours (blend "A"). Coincidentally, 37 parts of heavy creosote oil are added to 15 parts of coal-tar pitch, the temperature raised to 350° F. for one hour and 50 parts of pulverized coal added. The mixture is agitated and the temperature raised to 600° F. and held at this temperature for one hour until the coal dissolves (blend "B"). Blends "A" and "B" are then combined in an agitated vessel at a temperature between 200° F.–330° F. The mixture is cooled to room temperature and is ready for use.

The resulting composition is a material having a viscosity, while hot, at 250° F., using a Brookfield viscometer, Model LVF Spindle Number 4, 12 r.p.m. of between 10,000–18,000 centipoises and a penetration of 100–200 mm. at 77° F. (50 gms.; 5 seconds) ASTM D–5, and a ring and ball softening point of 40° C.–60° C.

*Example IX*

2 parts of medium molecular weight copolymer of butadiene and acrylonitrile are added to 35 parts of heavy creosote oil. The temperature of this mixture is raised to 300° F. and agitated for three hours (blend "A"). Coincidentally, 35 parts of heavy creosote oil are added to 15 parts of coal-tar pitch, the temperature raised to 350° F. for one hour and 55 parts of pulverized coal added. The mixture is agitated and the temperature raised to 600° F. and held at this temperature for one hour until the coal dissolves (blend "B"). Blends "A" and "B" are then combined in an agitated vessel at a temperature between 200° F.–330° F. for 2 to 3 hours. The mixture is cooled to room temperature and is ready for use.

The resulting composition is a material having a viscosity, while hot, at 250° F., using a Brookfield viscometer, Model LVF Spindle Number 4, 12 r.p.m., of between 7,000–15,000 centipoises and a penetration of 80–180 mm. at 77° F. (50 gms.; 5 seconds) ASTM D–5, and a ring and ball softening point of 45° C.–65° C.

*Example X*

5 parts of a medium molecular weight copolymer of butadiene and acrylonitrile in a 51:49 ratio are added to 30 parts of an aromatic distillate boiling in the range 230° C.–315° C. The temperature of this mixture is raised to 300° F. and agitated for two hours (blend "A"). Coincidentally, 30 parts of heavy creosote oil are added to 30 parts of coal-tar pitch, the temperature raised to 350° F. for one hour, and 40 parts of pulverized coal added. The mixture is agitated and the temperature raised to 600° F. and held at this temperature for one hour until the coal dissolves (blend "B"). Blends "A" and "B" are then combined in an agitated vessel at at temperature between 200° F.–300° F. for two to three hours. To 60 parts of this blend, 20 parts of solvent, toluene, are added. The mixture is cooled to room temperature and is ready for use.

The resulting composition is a material having a viscosity, while hot at 100° F., using a Brookfield viscometer, Model LVF Spindle Number 4, 6 r.p.m., of between 6,000-10,000 centipoises.

The composition as prepared in Example X was placed into a commercially available cartridge suitable for use in a caulking gun and subsequently used as caulking around the windows of a recently constructed building. The material quickly adhered to the area around the windows, and because of its elasticity, the composition formed a permanent vapor barrier which will not deteriorate from the effect of constant temperature variations.

Deterioration of concrete in alkaline soils, is a serious problem in the use of concrete for sewerage lines, tunnel liners, etc. One method of protecting this concrete is to remove the forms after the concrete has set, coating the concrete with a suitable bituminous coating, allowing this to dry, and then backfilling. A novel use of the composition of this invention, based on its particular properties of adhesion and corrosion-resistance, is a solution to the aforementioned problem. As an example, wooden forms for concrete pipe were placed in soil and coated, after erection, with the material as prepared in Example I, without heating the prepared composition. Concrete was then poured into the forms and cured. After curing of the concrete, the ditch in which the pipe was placed was backfilled, leaving the wooden forms and all in place. The coating previously placed on the wooden forms adhered to the concrete, and as the wooden forms deteriorated, a permanent alkaline-resistant coating of the composition was bonded to the concrete, giving complete protection from attack by corrosive agents in the soil.

The foregoing has described a novel, modified coal-tar pitch composition having a high degree of elasticity and flexibility, lowered temperature suscepitibily, improved adhesion, and ease of application while maintaining the corrosion-resistance of coal tar. The product of this invention may be used as a hot-applied crack and joint filler, caulking compound, roof coating or protective coating on metal for use in corrosive environments. Upon the addition of suitable solvents, such as xylene, toluene, etc., and in combination with various pigments, the composition is suitable for use as a cold-applied protective coating for steel, concrete, aluminum, and other substrates which are subject to environmental deterioration. When properly prepared and used for this purpose, the film produced upon evaporation exhibits excellent protective properties while concurrently maintaining the necessary elastic and flexible properties necessary for extended use. Because of the lower temperature susceptibility, the material will not melt or flow when exposed to ambient temperatures.

What is claimed is:
1. A flexible, corrosion resistant, instantly adherent, waterproof coating composition consisting essentially of:
   (A) a homogeneous solution of, by weight,
      (1) from about 10 percent to 30 percent coal having in excess of 10 percent volatile matter,
      (2) from about 1 percent to 15 percent of a butadiene acrylonitrile synthetic elastomer that is a copolymer comprised of from 51 to 81 parts by weight of butadiene and from 49 to 19 parts by weight of acrylonitrile,
      (3) from about 10 percent to 44 percent coal tar pitch having a softening point of from about 80° F. to about 200° F. and
      (4) from about 25 percent to 65 percent of a high boiling aromatic oil having a distillation range of from between 230° C. to about 530° C.
2. A flexible, corrosion resistant, instantly adherent waterproof coating composition consisting essentially of:
   (A) a homogeneous solution of, by weight,
      (1) from about 10 percent to 30 percent coal having in excess of 10 percent volatile matter,
      (2) from about 1 percent to 15 percent of a butadiene acrylonitrile synthetic elastomer that is a copolymer comprised of from 51 to 81 parts by weight of butadiene and from 49 to 19 parts by weight of acrylonitrile,
      (3) from about 10 percent to 44 percent coal tar pitch having a softening point of from about 80° F. to about 200° F. and
      (4) from about 25 percent to 65 percent of a heavy creosote oil having a distillation range of from about 290° C. to 350° C.
3. A flexible, corrosion resistant, instantly adherent, waterproof coating composition consisting essentially of:
   (A) a homogeneous solution of, by weight,
      (1) from about 1 percent to 15 percent of a butadiene acrylonitrile synthetic elastomer that is a copolymer comprised of from 51 to 81 parts by weight of butadiene and from 49 to 19 parts by weight of acrylonitrile,
      (2) from about 10 percent to 30 percent of coal,
      (3) from about 25 percent to about 65 percent heavy creosote oil and
      (4) from about 10 percent to 44 percent coal tar pitch.
4. A flexible, corrosion resistant, instantly adherent, waterproof coating composition consisting essentially of:
   (A) a homogeneous solution of, by weight,
      (1) from about 10 percent to 30 percent coal having in excess of 10 percent volatile matter,
      (2) from about 1 percent to 15 percent of a butadiene acrylonitrile synthetic elastomer comprised of:
         (a) from about 51 to 81 parts by weight of butadiene and
         (b) 49 to 19 parts by weight of acrylonitrile,
      (3) from about 10 percent to about 44 percent of coal tar pitch having a softening point of between 80° F. and 200° F. and
      (4) a high boiling aromatic oil which boils within the range of 230° C. to 530° C.
5. A method of protecting material subject to environmental deterioration which comprises:
   (A) dissolving from about 10 percent to 30 percent of coal having volatile matter in excess of 10 percent and from about 1 percent to 15 percent of butadiene acrylonitrile copolymer comprised of from 51 to 81 parts by weight of butadiene and from 49 to 19 parts by weight of acrylonitrile,
   (B) in a mixture of from about 10 percent to 44 percent coal tar pitch having a ring and ball softening point of from between 80° F. to 200° F. and from about 25 percent to 65 percent of a high boiling aromatic oil having a distillation range of from 230° C. to 530° C.,
   (C) adding a filler material,
   (D) cooling the thus prepared composition, and
   (E) coating a substrate therewith whereupon an instantaneous protective bond forms.

References Cited in the file of this patent
UNITED STATES PATENTS

| | | |
|---|---|---|
| 1,638,314 | Barth et al. | Aug. 9, 1927 |
| 2,095,190 | Bartholomaus | Oct. 5, 1937 |
| 2,246,760 | Ryan et al. | June 24, 1941 |
| 2,509,777 | McMillian et al. | May 30, 1950 |
| 2,978,351 | Pullar | Apr. 4, 1961 |